(12) United States Patent
Au et al.

(10) Patent No.: US 11,019,645 B2
(45) Date of Patent: *May 25, 2021

(54) SYSTEM AND METHOD FOR UPLINK GRANT-FREE TRANSMISSION SCHEME

(71) Applicant: Huawei Technologies Co., Ltd., Shenzhen (CN)

(72) Inventors: Kelvin Kar Kin Au, Kanata (CA); Hosein Nikopour, San Jose, CA (US); Petar Djukic, Nepean (CA); Zhihang Yi, Ottawa (CA); Alireza Bayesteh, Ottawa (CA); Jianglei Ma, Ottawa (CA); Mohammadhadi Baligh, Ottawa (CA); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,894

(22) Filed: Apr. 27, 2018

(65) Prior Publication Data

US 2018/0249490 A1 Aug. 30, 2018

Related U.S. Application Data

(63) Continuation of application No. 13/790,673, filed on Mar. 8, 2013, now Pat. No. 10,028,302.

(51) Int. Cl.
*H04W 72/12* (2009.01)
*H04W 72/02* (2009.01)
(Continued)

(52) U.S. Cl.
CPC ....... *H04W 72/1268* (2013.01); *H04L 1/0038* (2013.01); *H04L 1/1812* (2013.01);
(Continued)

(58) Field of Classification Search
CPC . H04W 72/1268; H04W 72/02; H04W 74/08; H04W 74/0825; H04L 1/0038;
(Continued)

(56) References Cited

U.S. PATENT DOCUMENTS 7,613,157 B2 11/2009 Pan et al.
8,917,686 B2 * 12/2014 Lee ..................... H04W 72/042
370/322
(Continued)

FOREIGN PATENT DOCUMENTS

CN 101682483 A 3/2010
CN 102158932 A 8/2011
(Continued)

OTHER PUBLICATIONS

"Exalted WP3—LTE-M System D3.3 Final report on LTE-M algorithms and procedures," Large Scale Integrating Project, FP7 Contract No. 258512, Jul. 31, 2012, 159 pages.
(Continued)

*Primary Examiner* — Donald L Mills
(74) *Attorney, Agent, or Firm* — Slater Matsil, LLP

(57) ABSTRACT

A method embodiment includes implementing, by a base station (BS), a grant-free uplink transmission scheme. The grant-free uplink transmission scheme defines a first contention transmission unit (CTU) access region in a time-frequency domain, defines a plurality of CTUs, defines a default CTU mapping scheme by mapping at least some of the plurality of CTUs to the first CTU access region, and defines a default user equipment (UE) mapping scheme by defining rules for mapping a plurality of UEs to the plurality of CTUs.

20 Claims, 9 Drawing Sheets

(51) Int. Cl.
*H04L 5/00* (2006.01)
*H04L 1/00* (2006.01)
*H04L 27/26* (2006.01)
*H04L 1/18* (2006.01)
*H04W 74/08* (2009.01)

(52) U.S. Cl.
CPC .......... *H04L 1/1861* (2013.01); *H04L 5/0005* (2013.01); *H04L 5/0033* (2013.01); *H04L 5/0041* (2013.01); *H04L 27/2613* (2013.01); *H04W 72/02* (2013.01); *H04W 74/08* (2013.01); *H04W 74/0825* (2013.01)

(58) Field of Classification Search
CPC ... H04L 1/1812; H04L 1/1861; H04L 5/0005; H04L 5/0033; H04L 5/0041; H04L 27/2613
See application file for complete search history.

(56) References Cited

U.S. PATENT DOCUMENTS

| | | | |
|---|---|---|---|
| 9,059,848 | B2 | 6/2015 | Larmo et al. |
| 9,277,454 | B2 | 3/2016 | Liao et al. |
| 10,028,302 | B2 | 7/2018 | Au et al. |
| 2008/0080472 | A1 | 4/2008 | Bertrand et al. |
| 2009/0067522 | A1 | 3/2009 | Kwak et al. |
| 2009/0092086 | A1 | 4/2009 | Lee et al. |
| 2009/0143071 | A1 | 6/2009 | Bergstrom et al. |
| 2009/0217118 | A1 | 8/2009 | Miki et al. |
| 2011/0029289 | A1 | 2/2011 | Guerrero et al. |
| 2011/0031756 | A1 | 2/2011 | Gabrys |
| 2011/0039568 | A1 | 2/2011 | Zhang et al. |
| 2011/0124357 | A1 | 5/2011 | Kim et al. |
| 2011/0134873 | A1* | 6/2011 | Cho .................. H04W 72/0413 370/329 |
| 2011/0170515 | A1* | 7/2011 | Kim ........................ H04W 4/70 370/330 |
| 2011/0176500 | A1 | 7/2011 | Wager et al. |
| 2011/0249632 | A1 | 10/2011 | Eriksson et al. |
| 2011/0292895 | A1 | 12/2011 | Wager et al. |
| 2011/0310811 | A1* | 12/2011 | Yamada .............. H04W 52/146 370/329 |
| 2011/0317563 | A1 | 12/2011 | Ishii et al. |
| 2012/0008853 | A1 | 1/2012 | Li et al. |
| 2012/0013461 | A1 | 1/2012 | Kron et al. |
| 2012/0014269 | A1 | 1/2012 | Ray et al. |
| 2012/0088531 | A1 | 4/2012 | Bonneville et al. |
| 2012/0182977 | A1 | 7/2012 | Hooli et al. |
| 2012/0213196 | A1* | 8/2012 | Chung .................. H04B 1/713 370/330 |
| 2012/0275381 | A1* | 11/2012 | Kim ...................... H04W 74/08 370/328 |
| 2012/0294269 | A1 | 11/2012 | Yamada et al. |
| 2012/0300744 | A1* | 11/2012 | Larmo .............. H04W 72/1284 370/329 |
| 2012/0307777 | A1 | 12/2012 | Pan et al. |
| 2012/0314619 | A1 | 12/2012 | Wilberg et al. |
| 2013/0010722 | A1 | 1/2013 | Suzuki et al. |
| 2013/0022012 | A1 | 1/2013 | Lee et al. |
| 2013/0034071 | A1 | 2/2013 | Lee et al. |
| 2013/0107781 | A1* | 5/2013 | Lu .......................... H04L 1/188 370/311 |
| 2014/0192767 | A1 | 7/2014 | Au et al. |
| 2019/0069326 | A1 | 2/2019 | Zhang et al. |

FOREIGN PATENT DOCUMENTS

| | | |
|---|---|---|
| RU | 2008127310 A | 1/2010 |
| WO | 2007078177 A1 | 7/2007 |
| WO | 2009033280 A1 | 3/2009 |
| WO | 2010057540 A1 | 5/2010 |
| WO | 2010100828 A1 | 9/2010 |
| WO | 2010114446 A1 | 10/2010 |
| WO | 2011019813 A2 | 2/2011 |
| WO | 2011097815 A1 | 8/2011 |
| WO | WO-2011136586 A2 * | 11/2011 .......... H04W 72/042 |
| WO | 2012044240 A1 | 4/2012 |

OTHER PUBLICATIONS

"Amendment 3: Enhancements for Very High Throughput in the 60 GHz Band, Part 11: Wireless LAN Medium Access Control (MAC) and Physical Layer (PHY) Specifications," IEEE Standard for Information Technology—Telecommunications and information exchange between systems, Local and metropolitan area networks—Specific Requirements, IEEE Standard Community, Dec. 2012, 628 pages.

Wang, X. et al., "Blind Multiuser Detection: A Subspace Approach," IEEE Transactions on Information Theory, vol. 44, No. 2, Mar. 1998, 14 pages.

Aydin, O.et al. "Deliverable D4.2 Final Report on Trade-Off Investigations; Mobile and Wireless Communications Enablers for the Twenty-Twenty Information Society (METIS)," ICT-317669-METIS/D4.2, Aug. 29, 2014, 96 pages.

Popovski, F.et al. "Deliverable D2.3 Components of a New Air Interface-Building Blocks and Performance; Mobile and Wireless Communications Enablers for the Twenty-Twenty Information Society, "ICT-317669-METIS/D2.3, Apr. 28, 2014, 117 pages.

* cited by examiner

SYSTEM AND METHOD FOR UPLINK GRANT-FREE TRANSMISSION SCHEME

CROSS-REFERENCE TO RELATED APPLICATIONS

This application is a continuation of U.S. patent application Ser. No. 13/790,673, entitled "System and Method for Uplink Grant-Fee Transmission Scheme," filed on Mar. 8, 2013, which application is hereby incorporated herein by reference.

TECHNICAL FIELD

The present invention relates to a system and method for wireless communications, and, in particular embodiments, to a system and method for uplink grant-free transmission scheme.

BACKGROUND

In a typical wireless network such as long-term evolution (LTE) network, the selection of shared data channels for uplink (UL) is scheduling/grant based, and the scheduling and grant mechanisms are controlled by a base station (BS) in a network. A user equipment (UE) sends an UL scheduling request to the base station. When the BS receives the scheduling request, the BS sends an UL grant to the UE indicating its UL resource allocation. The UE then transmits data on the granted resource.

An issue with this approach is that the signaling resource overhead for the scheduling/grant mechanism can be quite large, especially in cases where the data transmitted is small. For example, for small packet transmissions of around 20 bytes each, the resources used by the scheduling/grant mechanism could be around 30%, or even 50%, of the packet's size. Another issue with this approach is the scheduling/grant procedure causes an initial delay in data transmission. Even when the resources are available, there is a minimum 7-8 ms delay in a typical wireless network between a scheduling request being sent and the first uplink data transmission.

SUMMARY OF THE INVENTION

These and other problems are generally solved or circumvented, and technical advantages are generally achieved, by preferred embodiments of the present invention which provide a system and method for uplink grant-free transmission scheme.

In accordance with an embodiment, a method includes implementing, by a BS, a grant-free uplink transmission scheme. The grant-free uplink transmission scheme defines a first contention transmission unit (CTU) access region in a time-frequency domain, defines a plurality of CTUs, defines a default CTU mapping scheme by mapping at least some of the plurality of CTUs to the first CTU access region, and defines a default user equipment (UE) mapping scheme by defining rules for mapping a plurality of UEs to the plurality of CTUs.

In accordance with another embodiment, a base station (BS) includes a processor, and a computer readable storage medium storing programming for execution by the processor, the programming including instructions to implement a grant-free uplink transmission scheme, receive an uplink transmission from a user equipment (UE), attempt to decode the uplink transmission blindly, and indicate to the UE whether the attempt to decode the uplink transmission blindly was successful. The grant-free uplink transmission scheme defines a plurality of contention transmission units (CTUs), defines one or more CTU access regions in a time-frequency domain, creates a default CTU mapping scheme by mapping the plurality of CTUs to the one or more CTU access regions, and creates a default UE mapping scheme by defining rules for mapping a plurality of UEs to the plurality of CTUs.

In accordance with another embodiment, a method for a grant-free transmission scheme includes implementing, by a user equipment (UE), a default contention transmission unit (CTU) mapping scheme by determining an appropriate CTU for uplink transmission in accordance with a UE mapping rule and the default CTU mapping scheme, and transmitting an uplink transmission, to a base station (BS), on the appropriate CTU.

In accordance with yet another embodiment, a user equipment (UE) includes a processor, and a computer readable storage medium storing programming for execution by the processor, the programming including instructions to implement a default contention transmission unit (CTU) mapping scheme by determining an appropriate CTU for uplink transmission in accordance with a UE mapping rule and the default CTU mapping scheme, and transmitting, to a base station (BS), an uplink transmission on the appropriate CTU, determine whether a collision has occurred based on an indication by the BS, and re-transmit, to the BS, the uplink transmission using an asynchronous hybrid automatic repeat request (HARQ) mechanism when the UE determines a collision has occurred.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described with respect to a specific context, namely a LTE wireless communication network. Various embodiments may also be applied, however, to other wireless networks such as a worldwide interoperability for microwave access (WiMAX) network.

Figure 1:
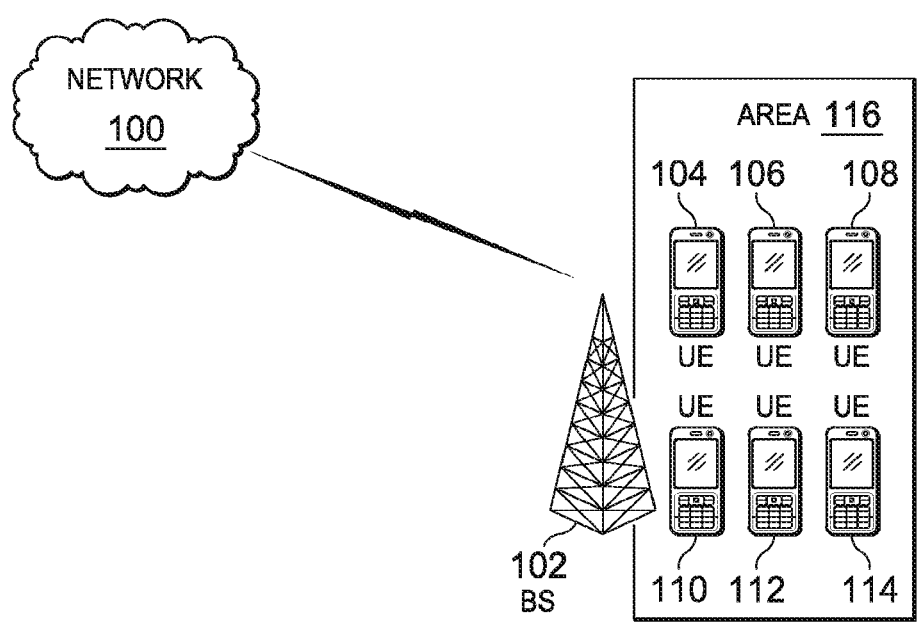
FIG. 1 is a block diagram illustrating a network in accordance with various embodiments.

FIG. 1 illustrates a block diagram of a network 100 according to various embodiments. A base station (BS) 102 manages uplink and downlink communications for various UEs 104-114 within its coverage area 116. BS 102 may alternatively be referred to as a cell tower, an eNodeB, an access network, and the like. BS 102 may support transmissions for multiple cellular carriers concurrently. BS 102 implements a grant-free uplink transmission scheme, wherein contention transmission unit (CTU) access regions are defined so that UEs 104-114 may contend for and access uplink resources without a request/grant mechanism. The grant-free uplink transmission scheme may be defined by the BS, or it may be set in a wireless standard (e.g., 3GPP). UEs 104-114 may be mapped to various CTU access regions to avoid collision (i.e., when two or more UEs attempt to transmit data on the same uplink resource). However, if collision occurs, UEs 104-114 may resolve collisions using an asynchronous HARQ (hybrid automatic repeat request) method. BS 102 blindly (i.e., without explicit signaling) detects active UEs and decodes received uplink transmissions.

Under this scheme, UEs 104-114 may send uplink transmissions without the BS allocating resources to request/grant mechanisms. Therefore, total network overhead resources are saved. Furthermore, this system allows for time savings during uplink by bypassing the request/grant scheme. Although only one BS 102 and six UEs 104-114 are illustrated in FIG. 1, a typical network may include multiple BS each covering transmissions from a varying multitude of UEs in its geographic coverage area.

Network 100 uses various high level signaling mechanisms to enable and configure grant-free transmissions. UEs 104-114 capable of grant-free transmissions signal this capability to BS 102. This allows BS 102 to support both grant-free transmissions and traditional signal/grant transmissions (e.g., for older UE models) simultaneously. The relevant UEs may signal this capability by, for example, RRC (radio resource control) signaling defined in the 3GPP (third generation partnership project) standard. A new field may be added to the UE capability list in RRC signaling to indicate whether the UE supports grant-free transmissions. Alternatively, one or more existing fields can be modified or inferred from in order to indicate grant-free support.

BS 102 also uses high-level mechanisms (e.g., a broadcast channel or a slow signaling channel) to notify UEs 104-114 of information necessary to enable and configure a grant-free transmission scheme. For example, BS 102 may signal that it supports grant-free transmissions, its search space and access codes for CTU access regions, a maximum size of a signature set (i.e., the total number of signatures defined), a modulation and coding scheme (MCS) setting, and the like. Furthermore, BS 102 may update this information from time to time using, for example, a slow signaling channel (e.g., a signaling channel that only occurs in the order of hundreds of milliseconds instead of occurring in every TTI).

BS 102 implements a grant-free uplink transmission scheme. The grant-free transmission uplink scheme defines CTU access regions to enable grant-free transmissions by UE 104-114. A CTU is a basic resource, predefined by network 100, for contention transmissions. Each CTU may be a combination of time, frequency, code-domain, and/or pilot elements. Code-domain elements may be CDMA (code division multiple access) codes, LDS (low-density signature) signatures, SCMA (sparse code multiple access) codebooks, and the like. These possible code-domain elements are referred to generically as "signatures" hereinafter. Multiple UEs may contend for the same CTU. The size of a CTU is preset by the network and may take into account an expected transmission size, the amount of desired padding, and/or MCS levels.

A CTU access region is a time-frequency region where contention transmission occurs. The grant-free uplink transmission scheme may define multiple CTU access regions for network 100. The grant-free transmission uplink scheme may be defined by BS 102 via high level signaling (e.g., through a broadcast channel) or it may be pre-defined by a standard and implemented in UEs (e.g., in a UE's firmware). The regions may exist in one or more frequency bands (intra-band or inter-band) and may occupy the entire uplink transmission bandwidth or a portion of the total transmission bandwidth of BS 102 or a carrier supported by BS 102. A CTU access region that occupies only a portion of the bandwidth allows BS 102 to simultaneously support uplink transmissions under a traditional request/grant scheme (e.g., for older UE models that cannot support grant-free transmissions). Furthermore, BS 102 may utilize unused CTUs for scheduled transmissions under a request/grant scheme, or BS 102 may adjust the size of CTU access regions if portions of the access regions are not used for a period of time. Furthermore, the CTU access regions may frequency hop periodically. BS 102 may signal these changes in CTU access region size and frequency to UEs 104-114 through a slow signaling channel.

Figure 2:
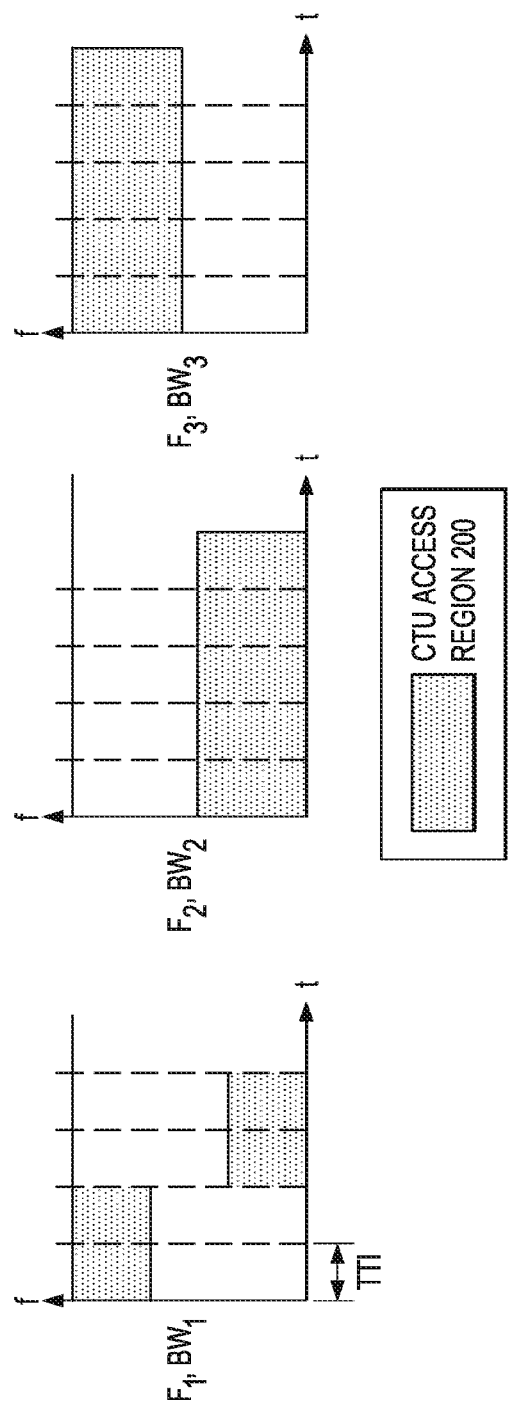
FIG. 2 is a diagram illustrating an example configuration of various contention transmission (CTU) access regions in accordance with various embodiments.

FIG. 2 illustrates an example configuration for various CTU access regions defined by BS 102. In FIG. 2, BS 102 supports transmissions for three carriers each operating at frequencies $F_1$, $F_2$ and $F_3$ with bandwidth $BW_1$, $BW_2$, and $BW_3$. FIG. 2 illustrates example CTU access regions 200 defined in all three carriers using different configurations. The configurations shown in FIG. 2 are for illustrative purposes only, and alternative CTU access region configurations may be defined in various embodiments.

Multiple CTU access regions (e.g., as illustrated in FIG. 2) allow each CTU access region to be categorized differently to provide different types of service to varying UE types. For example, the CTU access regions may be categorized to support different quality of service (QoS) levels, different UE configurations (e.g., in situations of carrier aggregation), different UE subscribed levels of service, different UE geometries, or a combination thereof. Furthermore, each CTU access region may be configured to support a different number of UEs. The size of each CTU access region may vary depending on the expected number of UEs using the region. For example, the size of a CTU access region may be based the history of loading in the CTU access region (such as the number of UEs), UE collision probability estimations, and/or measured UE collisions over a period of time.

Figure 3:
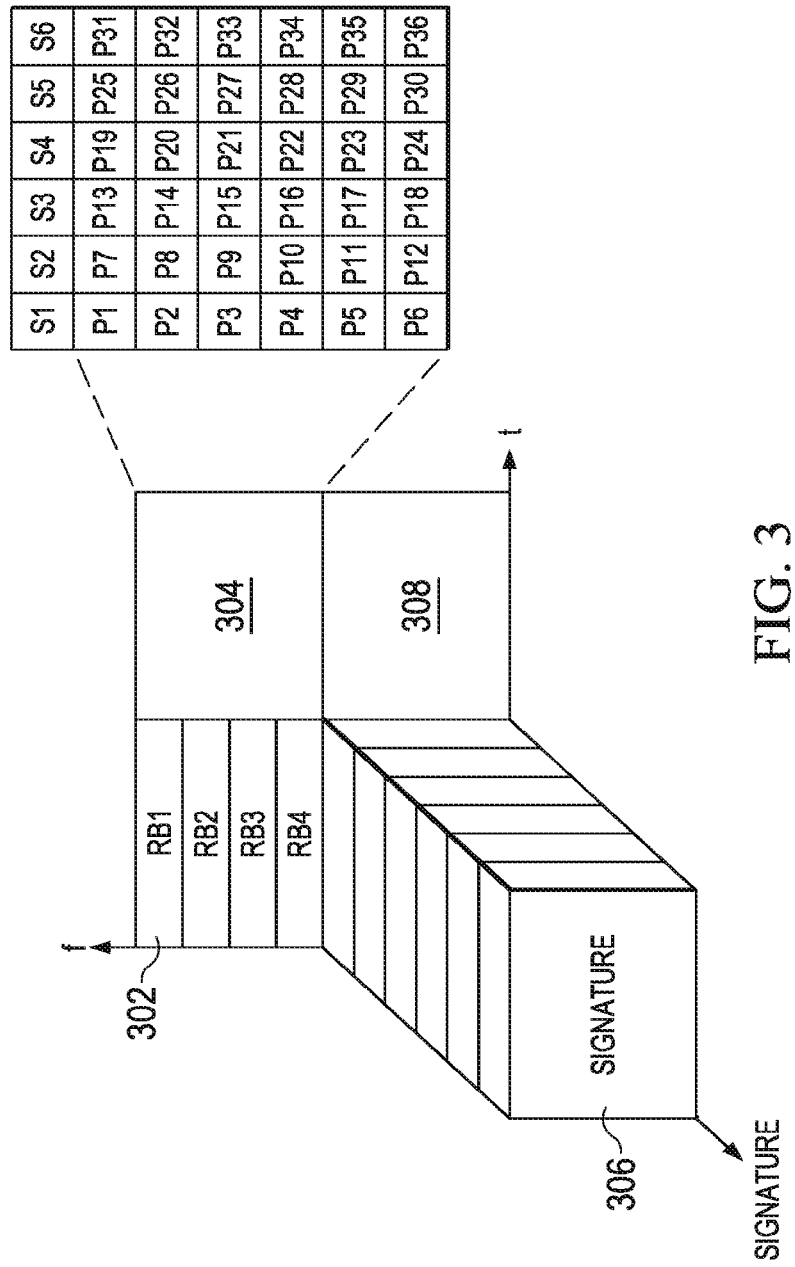
FIG. 3 is a diagram illustrating an example mapping of CTUs to CTU access regions in accordance with various embodiments.

FIG. 3 illustrates an example CTU resource definition in various CTU access regions. FIG. 3 illustrates four CTU access regions 302-308. The available bandwidth is divided into time-frequency regions for CTU access region 302-308, with each access region 302-308 occupying a predefined number of resource blocks (e.g., access region 302 occupies RBs 1-4) of bandwidth. In FIG. 3, CTUs are mapped identically to access regions 302-308, but varying views of this mapping are shown for illustrative purposes.

In FIG. 3, each CTU access region is capable of supporting up to thirty-six UEs contending for the thirty-six CTUs defined in each region. Each CTU is a combination of time, frequency, signature, and pilot. Each access region 302-308 occupies a distinct frequency-time region. These frequency-time regions are further broken down to each support six signatures ($S_1$-$S_6$) and six pilots mapped to each signature to create thirty-six total pilots ($P_1$-$P_{36}$). A pilot/signature decorrelator at BS 102 is used to detect and decode individual UE signals and transmissions.

Therefore, under this scheme different UEs conduct uplink transmissions on the same signature. Various embodiments support signature collisions (i.e., when several UEs simultaneously access the same frequency-time resources by using the same signature). In the known art, it was previously believed that signature collisions irreparably degrade UE performance and should be absolutely avoided. However, it has been observed that while signature collisions may degrade UE performance, the transmitted information can still be decoded by BS 102 using various decoding schemes (e.g., a JMPA scheme as described in detail in subsequent paragraphs). Furthermore, it has also been observed that signature collisions between two UEs (e.g., UEs 104 and 106) do not affect the performance of other UEs (e.g., UEs 108-114). Therefore, signature collisions are not detrimental to overall system performance. Various embodiments map multiple potential UEs to the same frequency-time-signature resource so that, at each contention transmission, the system may be fully loaded.

In contrast, pilot collisions may not be supported. Similar to signature collision, pilot collision refers to cases when multiple UEs simultaneously access the same frequency-time-signature resources by using the same pilot sequence. However, unlike signature collisions, pilot collisions may lead to irreparable results in a grant-free transmission scheme. This is due to BS 102 being unable to decode a UE's transmission information in pilot collision scenarios because BS 102's is unable to estimate the individual channels of UEs using the same pilot. For example, assume two UEs (UE 104 and 106) have the same pilot and their channels are $h_1$ and $h_2$, then BS 102 can only estimate a channel of quality of $h_1+h_2$ for both UEs 104 and 106. Thus, the transmitted information will not be decoded correctly. Various embodiments may define a number of unique pilots (e.g. thirty-six pilots per access region in FIG. 3) depending on the number of UEs supported in the system. The specific numbers given in FIG. 3 are for illustrative purposes only, and the specific configuration of the CTU access regions and CTUs may vary depending on the network.

Various embodiments enable grant-free transmissions through the inclusion of mechanisms for collision avoidance through UE to CTU mapping/re-mapping and collision resolution through asynchronous HARQ. For a UE to successfully perform uplink transmissions in a grant-free scheme, the UE must determine a CTU on which data can be sent. A UE determines the CTU it should use for transmissions based on predefined mapping rules known by both the UE (e.g., UEs 104-114) and the base stations (e.g., BS 102) in a network (e.g., network 100). These mapping rules may be implicit (i.e., default) rules pre-defined for the UE (e.g. in an applicable standard or in the firmware of the UE) and/or explicit rules defined by a BS using high level signaling. For example, different mapping rules (as referred to as mapping configurations) are pre-defined in a wireless standard, such as 3GPP, and the index of the applicable mapping configuration is signaled to a UE by the BS.

The grant-free uplink transmission scheme assigns a unique, identifying CTU index, $I_{CTU}$, to each CTU in the CTU access regions. UEs determine which CTUs to transmit on based on mapping rules for choosing an appropriate CTU index. The mapping of CTU indexes may be distributed uniformly over the available resources taking into account the size of the CTU regions over the time-frequency domain and the desire to reduce BS decoding complexity. The size of the CTU regions is taken into account so that UEs are not mapped to the same subset of available time-frequency resources.

Figure 4:
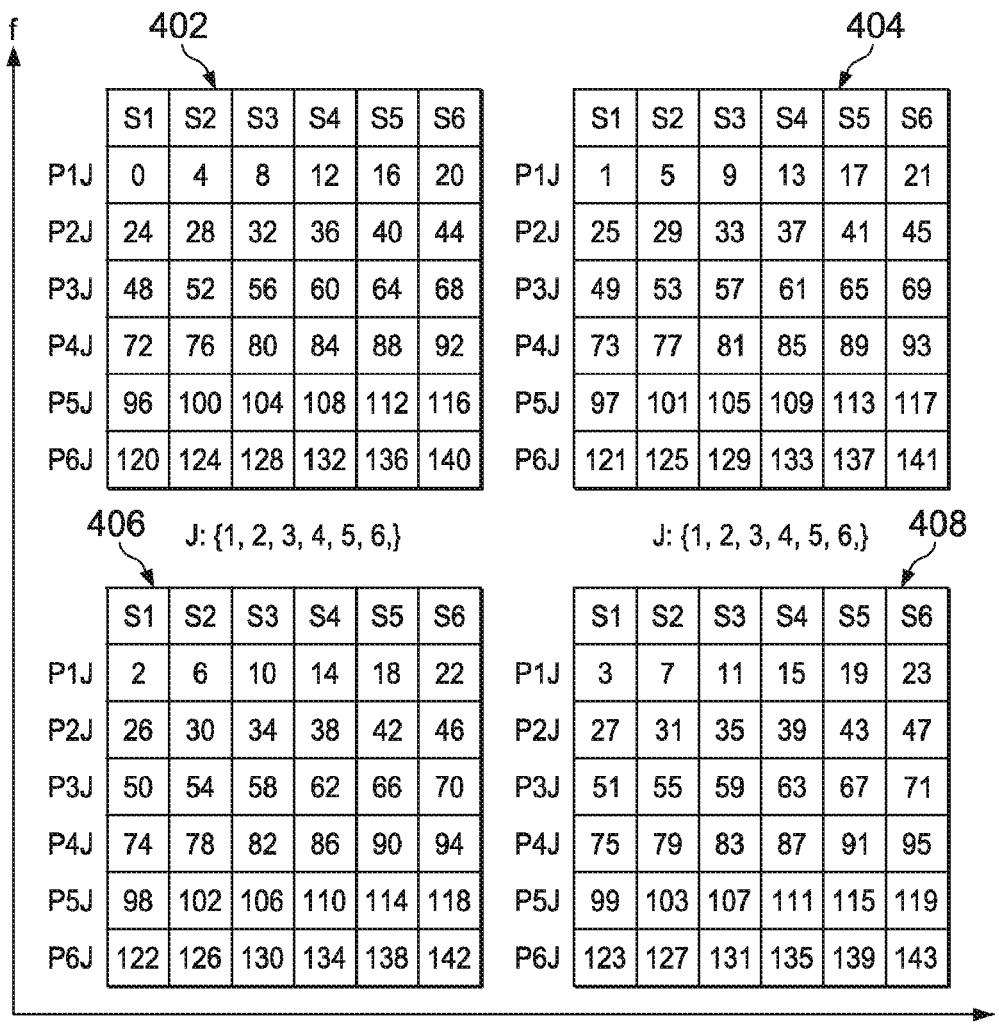
FIG. 4 is a diagram illustrating an example CTU index numbering in accordance with various embodiments.

For example, FIG. 4 illustrates such a distribution of CTU indexes over the CTU access regions. Each signature-pilot grid 402-408 corresponds to a time-frequency access region 302-308 from FIG. 3. As shown in FIG. 4, indexes are distributed in the following order: time, frequency, signature, and then pilot. For example, index 0 is mapped to a first time and a first frequency. Index 1 is then mapped to a second time in the first frequency. Index 2 is mapped to the first time in a second frequency, and index 3 is mapped to the second time in the second frequency. Only when all the time-frequency combinations are exhausted is the next index (index 4) mapped to a different signature in the first time and first frequency. In this manner all 144 CTU indexes (i.e., four access regions multiplied by thirty-six pilots per region) are mapped to distribute UEs over the region and reduce the chance of signature and pilot collision. Various alternative embodiments may use different mapping rules for CTU index mapping.

The inclusion of default mapping rules allows a UE to automatically transmit data on the mapped CTU as soon as it enters a BS's coverage area without additional signaling. These default mapping rules may be based on a UE's dedicated connection signature (DCS), its DCS index assigned by a BS, the total number of CTUs, and/or other parameters such as subframe number. For example, a UE i may map to a CTU resource index, $I_{CTU}$ based on a default formula:

$$I_{CTU}=DSC_i \bmod N_{CTU}$$

wherein $N_{CTU}$ represents the total number of available CTU indexes (e.g., 144 in the examples given in FIGS. 3-4) and $DSC_i$ is the DSC index of UE i.

A UE's DCS index may be assigned to the UE by a BS via high level signaling (e.g., through a broadcast, multicast, or unicast channel). Furthermore, this DCS index number may be used in conjunction with CTU index mapping to evenly distribute UEs across the CTU access regions. For example, when a UE enters a BS's (e.g., BS 102) coverage area, the BS may receive notice of the UE entering its area. BS 102 may assign a DCS index (hence the DSC) to the UE. For example, the first UE is assigned $DCS_1=0$, the second UE is assigned $DCS_2=1$, the third UE is assigned $DCS_3=2$, and so on. When the UE maps to a CTU resource based on a default mapping formula (e.g., $I_{CTU}=DSC_i \bmod N_{CTU}$), the UEs will be assigned indexes based on their DCS index and the total number of CTUs. By combining this mapping formula with the appropriate CTU index mapping (e.g., FIG. 4), the UEs may be distributed evenly across the CTU access regions. That is, the first UE will be mapped to index 0, the second UE will be mapped to index 1, etc.

Figure 5A:
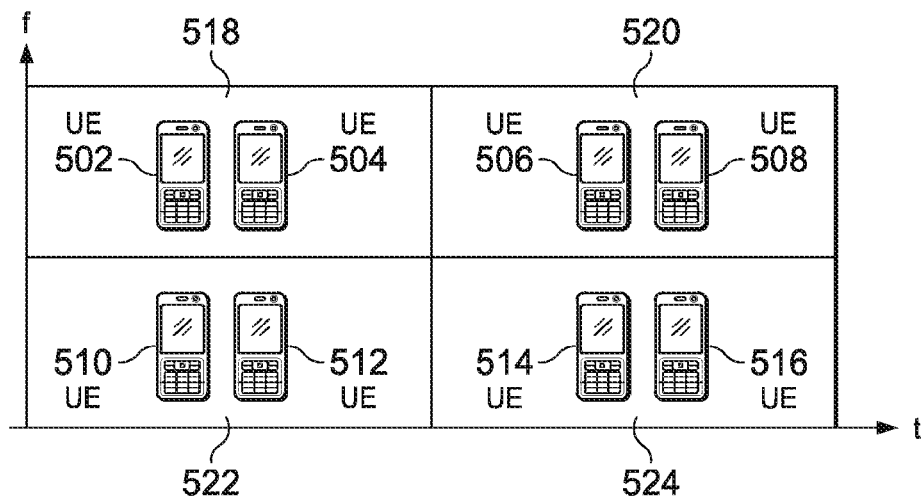
FIGS. 5A and 5B are diagrams illustrating an example UE mapping and remapping in accordance with various embodiments.
Figure 5B:
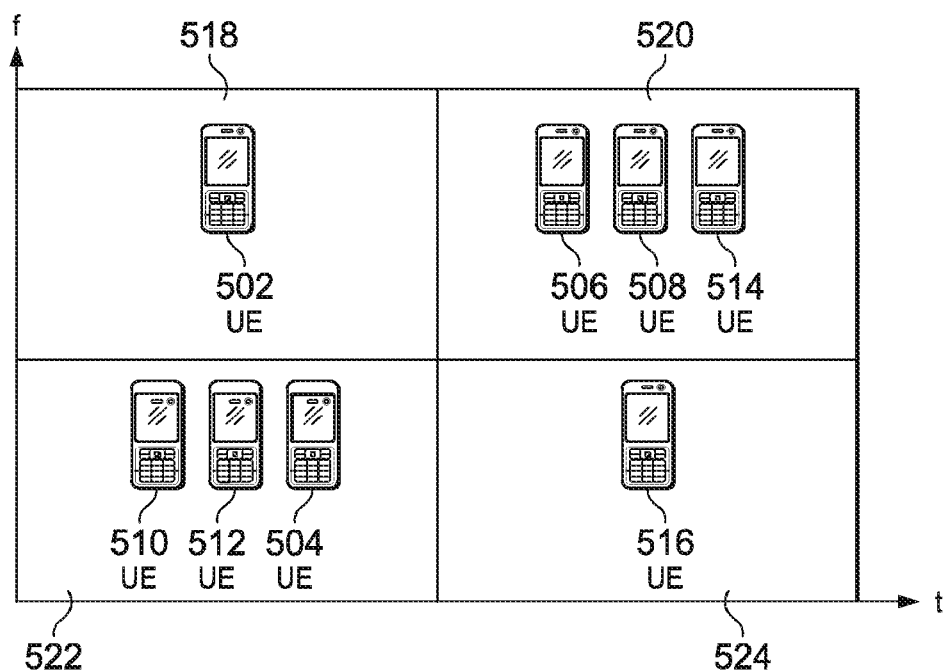

A subset of UEs may be re-mapped periodically by the network to reduce collisions. UEs may be remapped in cases when UEs exchange packets frequently in a data session (referred to as active UEs). These active UEs may experience higher probabilities of collision when they are unevenly distributed across the available CTU access regions. For example, FIG. 5A illustrates various UEs 502-516 mapped to four CTU access regions 518-524 under default mapping rules. In FIG. 5A, UEs 502, 504, 514, and 516 are active UEs mapped to two of the four available CTU access regions, increasing their probability for collision. A BS associated with the UEs (e.g., BS 102) determines that the default mapping is causing too many collisions and remaps certain UEs (e.g., UE 504 and 514) to the other CTU access regions as shown in FIG. 5B. BS 102 may detect the high level of collisions through high level signaling from the UEs or through repeated failed attempts to decode transmitted information (i.e., as previously discussed, pilot collisions cause failed attempts to decode transmission data). Alternatively, active UEs may be initially mapped to the same CTU in an access region. When the BS determines collisions are occurring due to this mapping, the active UEs may be re-mapped to different CTUs in the same access region. The various UEs 502-516 may revert to default mapping rules either implicitly when the UEs are no longer active or explicitly through network signaling. In alternative embodiments, this type of temporary re-mapping may also be used to provide certain UEs with dedicated resources for very time-sensitive transmissions when requested by the UE or configured by the network.

By implementing the described UE mapping strategies, the number of initial collisions in a CTU access region may be controlled. However, collisions may still occur and must be resolved. When transmissions are successful, the UE will be notified by the BS through, for example, an ACK (acknowledgement) signal. The BS only sends the ACK signal when transmissions are successful. Therefore, if a UE does not receive an ACK signal within a predetermined time period, the UE determines that collision has occurred. Alternatively, the BS may receive an NACK (negative acknowledgement)] signal when the transmission fails. The UE assumes transmission was successful unless it receives a NACK.

When collisions occur, they are resolved using asynchronous HARQ methods. Asynchronous HARQ methods differ from synchronous HARQ methods in that the UE does not attempt to retransmit on the same CTU when collision occurs. Rather the UE may choose a different CTU to retransmit on. For example, a random backoff procedure may be implemented. Each UE picks a backoff time period (e.g., a next TTI) randomly within a contention window to retransmit data. At the next TTI, the UE transmits data. The contention window size is a system parameter that may be signaled to the UE using high-level signaling.

When BS 102 receives transmitted information, it blindly decodes the transmitted information (referred to as blindly because BS 102 does not know which UE transmitted the information or which UEs are active in a network). For example, BS 102 may use JMPA (joint signature and data detection using MPA (message passing algorithm)) methods to blindly decode the transmitted information. Generally, MPA methods rely on channel knowledge and user-specific information to detect and decode data. JMPA initially assume all possible users might be active. It then iteratively detects the active users and simultaneously tries to detect their transmitted data. At the end of the iteration, among the all possible user pool, a list of active users and their detected data are provided by JMPA. A detailed description of a JMPA system and method may be found in U.S. Provisional Application No. 61/737,601, filed on Dec. 14, 2012, entitled "System and Method for Low Density Spreading Modulation Detection," which application is hereby incorporated herein by reference.

Figure 6:
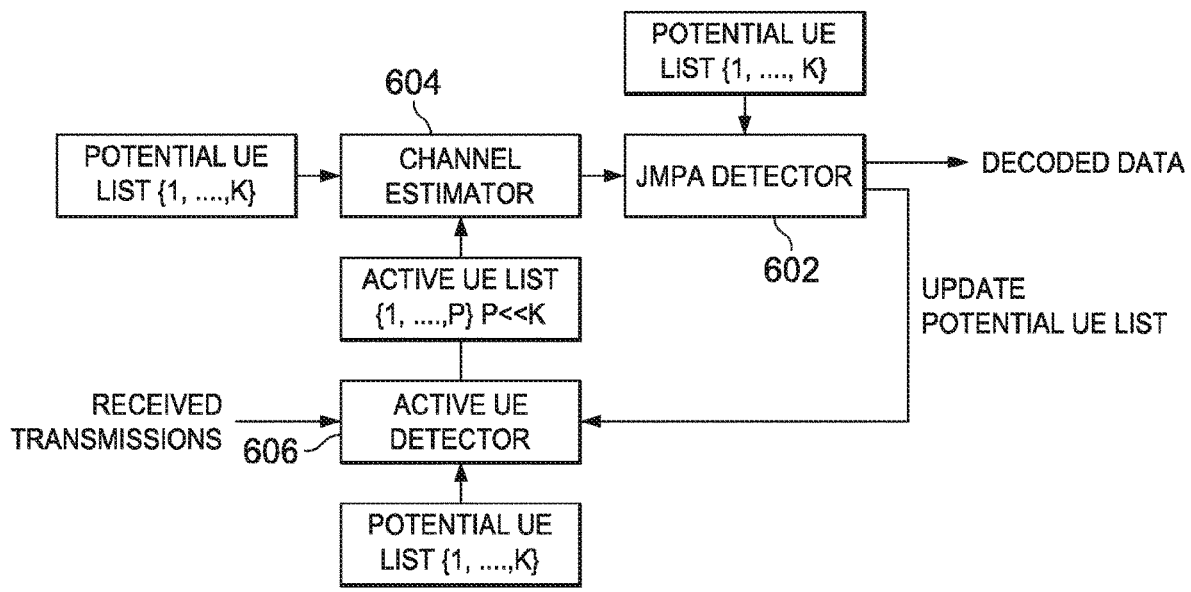
FIG. 6 is a block diagram of a joint signature and data detection using message passing algorithm method with an active UE detector in accordance with various embodiments.

An issue with this JMPA approach is that the original user pool might be very large to start with. It may make the complexity of the JMPA process impractically high. FIG. 6 illustrates a block diagram of a JMPA detector 602, channel estimator 604, with an active UE detector 606 to simplify the potentially high complexity of the JMPA process. A list of all potential UEs is fed into JMPA detector 602, channel estimator 604, and active UE detector 606. Active UE detector 606 uses the list of all potential UEs and received transmission data (e.g., all transmissions received by the BS from the CTU access regions) to generate a smaller list of potential active UEs. For example, as previously discussed multiple pilots may be correlated with each signature. Therefore, if active UE detector 606 determines a signature is not active, all corresponding pilots (i.e., CTU indexes/potential UEs) correlated with the inactive signature are also inactive. These pilots are removed from the list of potential UEs. If active UE detector 606 determines a pilot is inactive, it is taken off the list as well. In this manner, active UE detector 606 may decrease the list of potential active UEs for channel estimator 604 and JMPA detector 602, simplifying the decoding process. Furthermore, JMPA detector 602 may feed an updated list of potentially active UEs back to active UE detector 606. For example, JMPA detector 602 may determine that a second signature is inactive; this information is fed back to active UE detector 606 so that the corresponding pilots related to the second signature may be eliminated from the list of potential UEs.

Typically, uplink transmission performance depends on the number of the active signatures. A fewer number of overlaid signatures correlates to better expected performance from a MPA detector, such as the JMPA detector. This idea can be used to implicitly control the uplink quality. Based on long-term traffic statistics and the number of the potential active users, the network can statistically control the average number of the users transmitting within the same CTU access region. For example, different numbers of UEs can be grouped together to access different CTU access regions. The network can also limit the number of pilots and/or signatures in a CTU access region. If the channel quality of the UEs is historically good, more interference within a CTU access region may be tolerated (i.e., more of these UEs can be configured to access a CTU access region allow for more pilots and/or signatures to be defined). This long-term link-adaptation mechanism is controlled by the network through the defining of CTU access regions and the mapping of UEs to access regions.

Figure 7A:
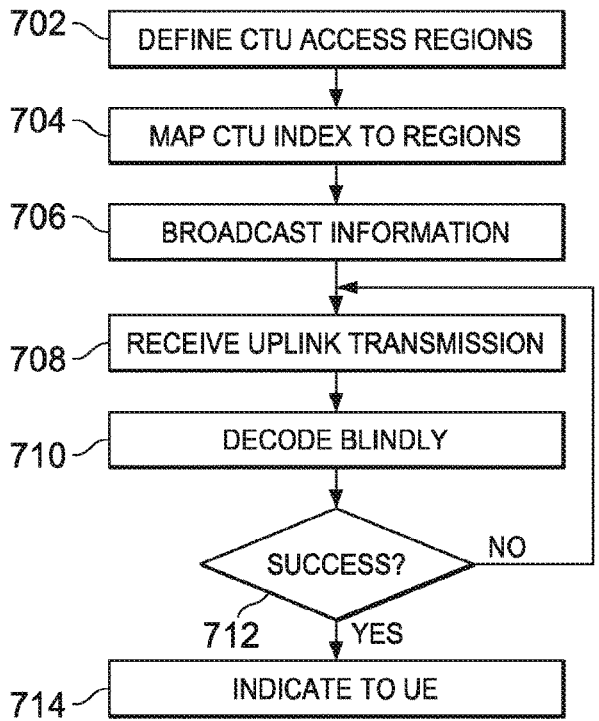
FIGS. 7A and 7B are flow diagrams of base station (BS) activity in accordance with various embodiments.

FIG. 7A illustrates a flow diagram of network activity (e.g., through BS 102) according to various embodiments. In step 702, BS 102 defines CTU access regions. In step 704, BS 102 maps various CTU indexes to the CTU access region. Each CTU index corresponds to a CTU a UE (e.g., UE 104) may perform grant-free transmissions on. In step 706, BS 102 uses high-level signaling (e.g., through a broadcast channel) to send information enabling grant-free transmissions. This high-level signaling includes information on the defined CTU access regions, number of CTUs in the access regions and/or CTU index map. The high-level signaling may also include assigned DCS index information, and the like.

Steps 702-706 illustrate BS 102 defining and implementing a grant-free uplink transmission scheme. Alternatively, BS 102 may perform none or a subset of steps 702-706 because certain steps are pre-configured for BS 102 by a standard. For example, a standard may eliminate step 702 by pre-defining CTU access regions. BS 102 need only perform steps 704 and 706 (i.e., mapping CTU indexes to the CTU access regions and transmitting information). In another example, a standard defines the grant-free uplink transmission scheme and BS 102 need only implement the grant-free uplink transmission scheme.

In step 708, BS 102 receives an uplink transmission from UE 104. In step 710, the BS decodes the uplink transmission information blindly using, for example, a JMPA and active UE detector method. In step 712, BS 102 determines whether the decoding was successful. If not, BS 102 assumes that collision has occurred, and waits to receive another uplink transmission. BS 102 also indicates to UE 104 whether the decoding was successful. BS 102 may do this by sending an ACK signal only if the transmission is successfully decoded. Alternatively, BS 102 may send a NACK signal if the transmission was not successfully decoded.

Figure 7B:
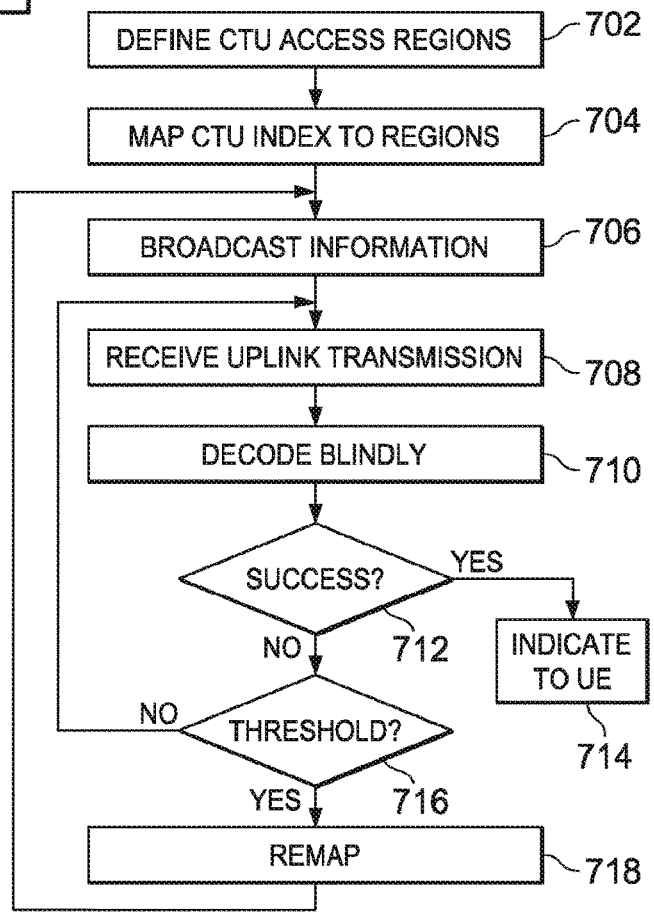

In an alternative embodiment illustrated in FIG. 7B, if decoding was not successful in step 712, BS 102 determines if the number of failed decodings (i.e., collisions) is above a certain configurable threshold. If not, BS 102 waits for the next transmission. If the number of failures meets a certain threshold, BS 102 uses this information and overall conditions (e.g. distribution of active UEs in the CTUs) to make decision on remapping the UEs to other CTU indexes in the same or a different CTU access region in step 718. BS 102 then returns to step 706 to send the remapped CTU information via high-level signaling (e.g., broadcast, multicast, or unicast) to the UEs in its coverage area.

Figure 8A:
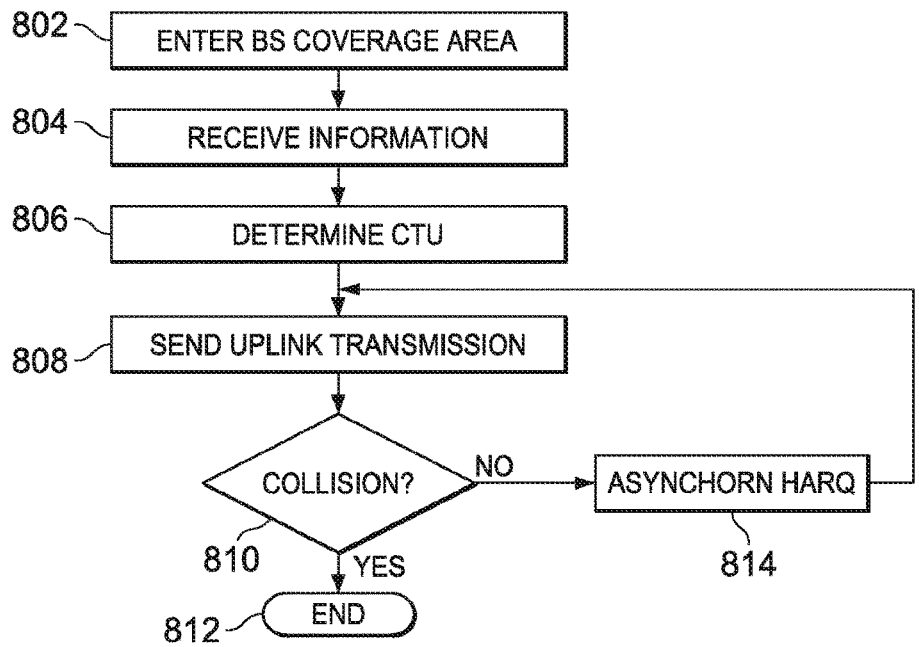
FIGS. 8A and 8B are flow diagrams of user equipment (UE) activity in accordance with various embodiments.

FIG. 8A illustrates a flow diagram of UE activity in accordance with various embodiments. In step 802, UE (e.g., UE 104) enters a BS's coverage area. In step 804, UE 104 receives high-level signaling information from the BS. This high level signaling information includes CTU access region definitions, total number of CTUs, default mapping rules, and the like. Alternatively, UE 104 may be preconfigured with default mapping rules. In step 806, UE 104 determines an appropriate CTU to conduct uplink transmissions on (e.g., UE 104 may determine an appropriate CTU index using default mapping rules).

In Step 808, UE 104 transmits information on the appropriate CTU. In step 810, UE 104 determines whether collision has occurred based on an indication from the BS. For example, the UE may wait a predetermined amount of time for an ACK signal. If an ACK signal is received, then in step 812, the uplink procedure is concluded and UE 104 moves on to its next task. If no ACK signal is received, UE 104 determines that collision has occurred, and moves to step 814. In step 814, UE 104 resolves the collision using an asynchronous HARQ method. Alternatively, UE 104 assumes no collision has occurred unless it receives a NACK. If a NACK is received, the UE then continues with the collision resolution procedure.

Figure 8B:
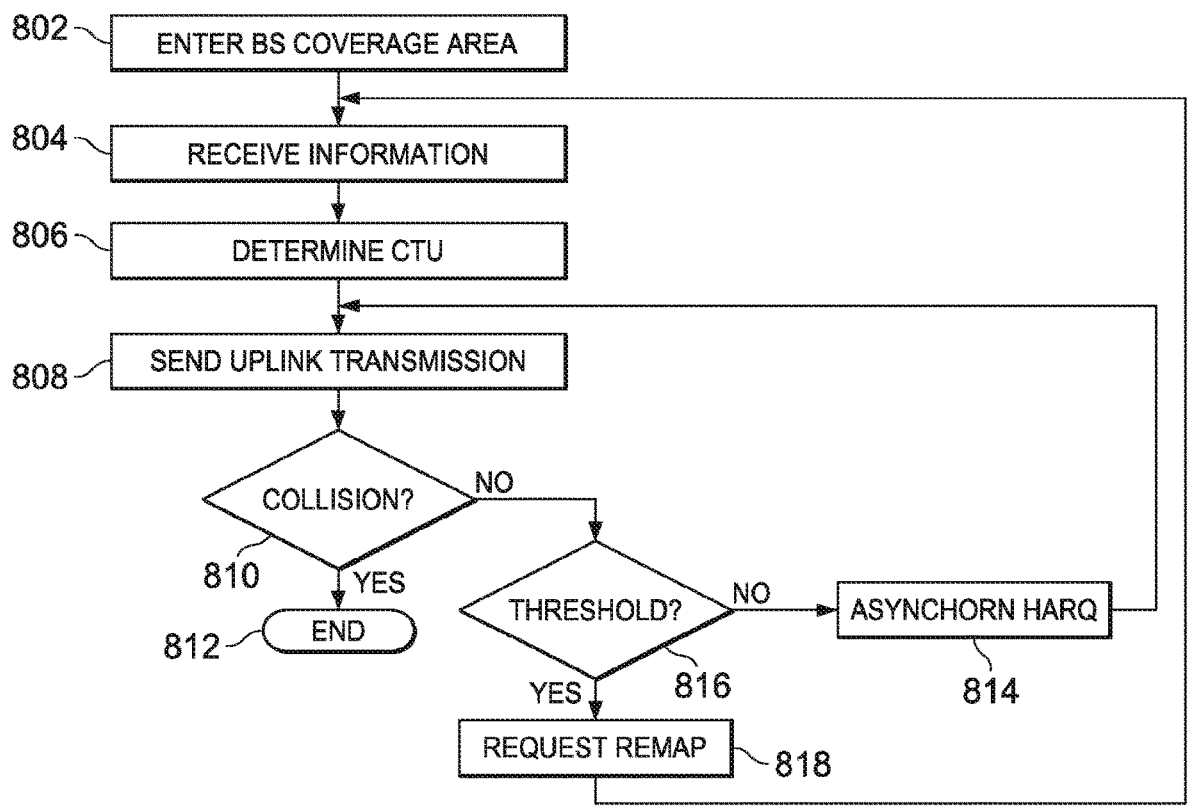

In an alternative embodiment illustrated in FIG. 8B, if UE 104 determines collision has occurred, UE 104 then determines if the number of collisions exceed a certain threshold. If not, then UE 104 returns to step 814 and resolves the collision using an asynchronous HARQ method. If the threshold is met, then in step 818, UE 104 may request remapping of CTUs by the BS. UE 104 then returns to step 804 and waits to receive the remapping information form the BS and proceed with the uplink procedure. In another embodiment, step 818 is optional and UEs do not send a request for remapping. The decision whether to remap UEs is made by the BS based on aggregate information on the collisions of UEs in the CTUs. UE 104 may continue to try to resolve the collision using an asynchronous HARQ method.

Figure 9:
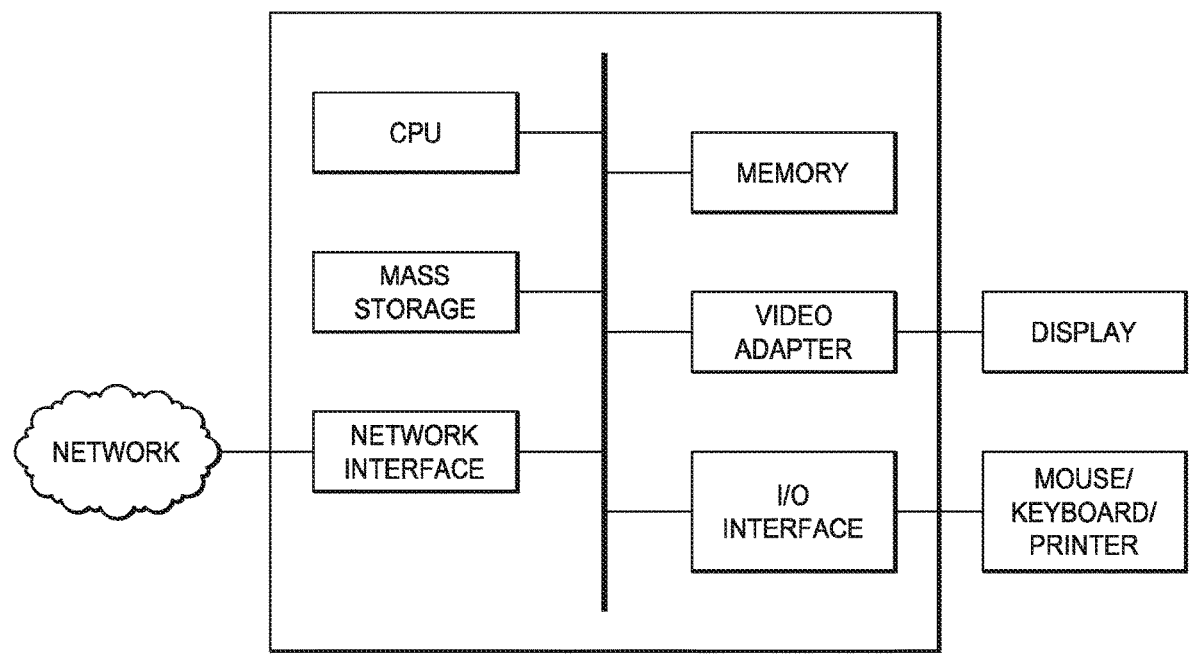
FIG. 9 is a block diagram illustrating a computing platform that may be used for implementing, for example, the devices and methods described herein, in accordance with an embodiment.

FIG. 9 is a block diagram of a processing system that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

In a first embodiment, a method comprising: implementing, by a base station (BS), a grant-free uplink transmission scheme, wherein the grant-free uplink transmission scheme: defines a first contention transmission unit (CTU) access region in a time-frequency domain; defines a plurality of CTUs; defines a default CTU mapping scheme by mapping at least some of the plurality of CTUs to the first CTU access region; and defines a default user equipment (UE) mapping scheme by defining rules for mapping a plurality of UEs to the plurality of CTUs.

In a second embodiment, combing the first embodiment further comprising: defining, by the BS, at least a portion of the grant-free uplink transmission scheme; and transmitting the portion of the grant-free uplink transmission scheme defined by the BS using high-level signaling.

In a third embodiment, combing the first embodiment further define: wherein at least a portion of the grant-free uplink transmission scheme is pre-configured on the BS in conformance with a standard.

In a fourth embodiment, combing the first embodiment further define: wherein implementing the grant-free transmission uplink scheme further comprising: receiving, by the BS, an uplink transmission from a user equipment (UE); attempting to decode the uplink transmission blindly; and indicating, to the UE, whether the attempting to decode the uplink transmission blindly was successful.

In a five embodiment, combing the first embodiment further define: wherein the grant-free uplink transmission scheme further defines a second CTU access region in the time-frequency domain and further defines the default mapping scheme by mapping the multitude of CTUs to the first and second CTU access regions, and wherein the implementing the grant-free transmission uplink scheme further comprises: defining, by the BS, a CTU remapping scheme by remapping a portion of the plurality of CTUs to the first and second CTU access regions when the BS determines a number of collisions is too frequent, wherein the BS determines the number of collisions is too frequent when: the BS determines a number times attempting to decode the uplink transmission blindly was unsuccessful and the number of times is over a threshold; or the BS receives a remapping request signal from the UE; and sending information related to the remapping scheme using high-level signaling.

In a six embodiment, combing the first embodiment further define: wherein the default UE mapping scheme maps the UE to a first CTU, the first CTU being one of the plurality of CTUs, and wherein implementing the grant-free transmission uplink scheme further comprises: defining, by the BS, a UE remapping scheme by mapping the UE to a second CTU, the second CTU being one of the plurality of CTUs other than the first CTU, when the BS determines a number of collisions is too frequent, wherein the BS determines the number of collisions is too frequent when: the BS determines a number times attempting to decode the uplink transmission blindly was unsuccessful and the number of times is over a threshold; or the BS receives a remapping request signal from the UE; and sending information related to the UE remapping scheme using high-level signaling.

In a seven embodiment, combing the first embodiment and the third further define: wherein attempting to decode the uplink transmission blindly comprises using a joint signature and data detection using a message passing algorithm (JMPA) method in combination with an active UE detector method, wherein the active UE detector method comprises: receiving a list of all potential UEs; receiving a multitude of signals transmitted over the time-frequency domain; receiving an output, from the JMPA method, comprising an updated list of potential UEs, wherein the updated list includes fewer potential UEs than the list of all potential UEs; and creating an active potential UE list in accordance with the multitude of signals and the updated list of potential UEs.

In an eighth embodiment, combing the first embodiment further define: wherein the grant-free uplink transmission scheme defines a number of unique pilots for grant-free uplink transmissions.

In an ninth embodiment, a base station (BS) comprising: a processor; and a computer readable storage medium storing programming for execution by the processor, the programming including instructions to: implement a grant-free uplink transmission scheme, wherein the grant-free uplink transmission scheme: defines a plurality of contention transmission units (CTUs); defines one or more CTU access regions in a time-frequency domain; creates a default CTU mapping scheme by mapping the plurality of CTUs to the one or more CTU access regions; and creates a default UE mapping scheme by defining rules for mapping a plurality of UEs to the plurality of CTUs; receive an uplink transmission from a user equipment (UE); attempt to decode the uplink transmission blindly; and indicate to the UE whether the attempt to decode the uplink transmission blindly was successful.

In a tenth embodiment, combing the ninth embodiment further define: wherein the plurality of CTUs comprises individual CTUs each defined as a time, frequency, signature, pilot, or a combination thereof element.

In an eleventh embodiment, combing the ten embodiment further define: The BS of claim 10, wherein each CTU is defined as a combination of time, frequency, signature, and pilot elements, and the grant-free uplink transmission scheme maps multiple pilot elements to each signature element.

In a twelve embodiment, combing the ninth embodiment further define: wherein the grant-free uplink transmission scheme defines a plurality of CTU access regions, the plurality of CTU access regions each provide a type of service to the UE based on quality of service (QoS) level of the UE, configuration, subscribed level of service, geometry, or a combination thereof.

In a thirteenth embodiment, combing the ninth embodiment further define: wherein a size of each of the one or more CTU access regions is defined based on an estimated probability of collisions, a number of total collisions over a period of time, a number of UEs supported by the BS, or a combination thereof.

In a fourteenth embodiment, combing the ninth embodiment further define: wherein a size of each of the plurality of CTUs is defined based on an expected transmission threshold, a desired padding level, a modulation coding scheme (MCS) level, or a combination thereof.

In a fifteenth embodiment, combing the ninth embodiment further define: wherein the grant-free uplink transmissions scheme creates a default CTU mapping in accordance with goals of distributing potential UEs uniformly over the one or more CTU access regions and reducing a probability of pilot collision.

In a sixteen embodiment, a method for a grant-free transmission scheme comprising: implementing, by a user equipment (UE), a default contention transmission unit (CTU) mapping scheme by: determining an appropriate CTU for uplink transmission in accordance with a UE mapping rule and the default CTU mapping scheme; and transmitting an uplink transmission, to a base station (BS), on the appropriate CTU.

In a seventeenth embodiment, combing the sixteenth embodiment further define: further comprising, after sending an uplink transmission: determining, by the UE, whether a collision has occurred based on an indication by the BS; and resolving the collision using an asynchronous hybrid automatic repeat request (HARQ) method when the UE determines a collision has occurred.

In a eighteenth embodiment, combing the sixteenth embodiment further define: further comprising transmitting, by the UE, a remapping request to the BS using high-level signaling when the UE determines a number of collisions have occurred and the number of collisions is above a threshold.

In a nineteenth embodiment, a user equipment (UE) comprising: a processor; and a computer readable storage medium storing programming for execution by the processor, the programming including instructions to: implement a default contention transmission unit (CTU) mapping scheme by: determining an appropriate CTU for uplink transmission in accordance with a UE mapping rule and the default CTU mapping scheme; and transmitting, to a base station (BS), an uplink transmission on the appropriate CTU; determine whether a collision has occurred based on an indication by the BS; and re-transmit, to the BS, the uplink transmission using an asynchronous hybrid automatic repeat request (HARQ) mechanism when the UE determines a collision has occurred.

In a twenty embodiment, combing the nineteenth embodiment further define: wherein the UE mapping rule includes information for determining an appropriate CTU in accordance with a dedicated connection signature (DCS) of the UE, a DCS index, a total number of CTUs in the default CTU mapping scheme, a subframe number, or a combination thereof.

In a twenty one embodiment, combing the nineteenth embodiment further define: wherein the UE mapping rule includes information for determining an appropriate CTU index corresponding to an index in the default CTU mapping scheme in accordance with:

ICTU=DSCi mod NCTU, wherein ICTU is a CTU index, DSCi is a DCS index assigned to the UE by the BS, and NCTU is a total number of CTUs in the CTU mapping scheme.

In a twenty two embodiment, combing the nineteenth embodiment further define: wherein the UE mapping rule is pre-configured on the UE.

In a twenty three embodiment, combing the nineteenth embodiment further define: wherein the UE is configured to receive the UE mapping rule from the BS.

In accordance with an embodiment, a method for communicating data is provided. In this embodiment, the method includes receiving information from a base station (BS) that uniquely identifies a first Contention Transmission Unit (CTU) in a plurality of CTUs and transmitting a first uplink data transmission to the BS without receiving an allocation of resources from the BS according to a request/grant mechanism. The first CTU includes a combination of time, frequency, and pilot elements, and the first uplink data transmission is transmitted using the first CTU in a first time-frequency region. In one example, the information indicates a configuration mapping or re-mapping of the UE to the first CTU. In the same example, or in another example, the first CTU further comprises a signature element. In any one of the preceding examples, or in another example, the information comprises a first CTU index uniquely identifying the first CTU in the plurality of CTUs, and wherein each CTU in the plurality of CTUs is uniquely identified by a particular CTU index. In any one of the preceding examples, or in another example, the method further comprises receiving high-level signaling from the BS to configure grant-free transmissions by the UE. In any one of the preceding examples, or in another example, the first time-frequency region comprises a CTU access region configured to support contention transmissions by a plurality of UEs. In any one of the preceding examples, or in another example, the method further comprises transmitting Radio Resource Connection (RRC) signaling to the BS that indicates a capability for grant-free transmissions. An apparatus for performing this method is also provided.

In accordance with an embodiment, a method for communicating data is provided. In this embodiment, the method includes sending information to a user equipment (UE) that uniquely identifies a first Contention Transmission Unit (CTU) in a plurality of CTUs and receiving a first uplink data transmission from the UE without sending an allocation of resources to the UE according to a request/grant mechanism. The first CTU includes a combination of time, frequency, and pilot elements, and the first uplink data transmission is transmitted using the first CTU in a first time-frequency region. In one example, the information indicates a configuration mapping or re-mapping of the UE to the first CTU. In the same example, or in another example, the first CTU further comprises a signature element. In any one of the preceding examples, or in another example, the information comprises a first CTU index uniquely identifying the first CTU in the plurality of CTUs, and each CTU in the plurality of CTUs is uniquely identified by a particular CTU index. In any one of the preceding examples, or in another example, the method further includes transmitting higher layer signaling to the UE, the higher layer signaling configuring grant-free transmissions by the UE. In any one of the preceding examples, or in another example, the first time-frequency region comprises a CTU access region configured to support contention transmissions by a plurality of UEs. In any one of the preceding examples, or in another example, the method further includes receiving Radio Resource Connection (RRC) signaling from the UE that indicates a capability for grant-free transmissions. An apparatus for performing this method is also provided.

In accordance with yet another embodiment, another method for communicating data is provided. In this embodiment, the method includes receiving a first information from a base station (BS) via higher layer signaling that indicates a first contention transmission unit (CTU). The first CTU includes a time resource, a frequency resource, and a pilot resource. The method further includes transmitting a first uplink data transmission to the BS without using a request/grant mechanism to obtain an allocation of resources from the BS. The first uplink data transmission is transmitted using the first CTU in a first CTU access region. The method further includes receiving a second information from the BS via higher layer signaling. The second information indicates a configuration re-mapping the UE to a second CTU that is different than the first CTU. In one example, the first information indicates a configuration mapping the UE to the first CTU. In the same example, or in another example, the first CTU further includes a signature resource. In any one of the preceding examples, or in another example, the second CTU is in the first CTU access region or a second CTU access region. In any one of the preceding examples, or in another example, the method further includes receiving a message from the BS via higher layer signaling to configure grant-free transmissions by the UE. In any one of the preceding examples, or in another example, the first CTU access region is configured to support contention based transmissions by a plurality of UEs. In any one of the preceding examples, or in another example, the method further includes transmitting Radio Resource Connection (RRC) signaling to the BS that indicates a capability for grant-free transmissions. An apparatus for performing this method is also provided.

In accordance with yet another embodiment, another method for communicating data is provided. In this embodiment, the method includes transmitting a first information to a user equipment (UE) via higher layer signaling, the first information indicating a first contention transmission unit (CTU). The first CTU includes a time resource, a frequency resource, and a pilot resource. The method further includes receiving a first uplink data transmission from the UE without using a request/grant mechanism to allocate resources to the UE. The first uplink data transmission is transmitted using the first CTU in a first CTU access region. The method further includes transmitting a second information to the UE via higher layer signaling that indicates a configuration re-mapping the UE to a second CTU that is different than the first CTU. In one example, the first information indicates a configuration mapping the UE to the first CTU. In the same example, or in another example, the first CTU further includes a signature resource. In any one of the preceding examples, or in another example, the second CTU is in the first CTU access region or a second CTU access region. In any one of the preceding examples, or in another example, the method further includes transmitting a message to the UE BS via higher layer signaling to configure grant-free transmissions by the UE. In any one of the preceding examples, or in another example, the first CTU access region is configured to support contention based transmissions by a plurality of UEs. In any one of the preceding examples, or in another example, the method further includes receiving Radio Resource Connection (RRC) signaling from the UE that indicates a capability for grant-free transmissions. An apparatus for performing this method is also provided.

In accordance with yet another embodiment, another method for communicating data is provided. In this embodiment, the method includes receiving information from a base station (BS) via higher layer signaling that indicates a first contention transmission unit (CTU) that includes a time resource, a frequency resource, and a pilot resource, and transmitting a first uplink data transmission to the BS without using a request/grant mechanism to obtain an allocation of resources from the BS for the first uplink data transmission. The first uplink data transmission is transmitted using the first CTU in a first CTU access region. In one example, the information indicates a configuration mapping or re-mapping the UE to the first CTU. In the same example, or in another example, the first CTU further includes a signature resource. In any one of the preceding examples, or in another example, the information comprises a UE mapping rule mapping the first CTU to the UE, and the method further includes determining the first CTU based on the UE mapping rule. In any one of the preceding examples, or in another example, the method further includes receiving a message from the BS via higher layer signaling to configure grant-free transmissions by the UE. In any one of the preceding examples, or in another example, the first CTU access region is configured to support contention transmissions by a plurality of UEs. In any one of the preceding examples, or in another example, further comprising transmitting Radio Resource Connection (RRC) signaling to the BS that indicates a capability for grant-free transmissions. An apparatus for performing this method is also provided.

In accordance with yet another embodiment, another method for communicating data is provided. In this embodiment, the method includes transmitting information to a user equipment (UE) via higher layer signaling that indicates a first contention transmission unit (CTU) that includes a time resource, a frequency resource, and a pilot resource, and receiving a first uplink data transmission from the UE without using a request/grant mechanism to allocate resources to the UE for the first uplink transmission. The first uplink data transmission is transmitted using the first CTU in a first CTU access region. In one example, the information indicates a configuration mapping or re-mapping the UE to the first CTU. In the same example, or in another example, the first CTU further includes a signature resource. In any one of the preceding examples, or in another example, the information comprises a UE mapping rule mapping the first CTU to the UE, and the method further includes determining the first CTU based on the UE mapping rule. In any one of the preceding examples, or in another example, the method further includes transmitting a message to the UE via higher layer signaling to configure grant-free transmissions by the UE. In any one of the preceding examples, or in another example, the first CTU access region is configured to support contention transmissions by a plurality of UEs. In any one of the preceding examples, or in another example, the method further includes receiving Radio Resource Connection (RRC) signaling from the UE that indicates a capability for grant-free transmissions. An apparatus for performing this method is also provided.

In accordance with yet another embodiment, another method for communicating data is provided. In this embodiment, the method sending a first uplink transmission to a base station (BS) without using a request/grant mechanism to obtain a resource allocation for the first uplink transmission from the BS. The uplink transmission is sent using a first contention transmission unit (CTU), wherein the first CTU includes a time resource, a frequency resource, and a pilot resource. The method further includes determining whether information carried by the first uplink transmission was successfully decoded by the BS based on whether an acknowledgement (ACK) signal associated with the first uplink transmission is received from the BS. In one example, if no ACK signal associated with the first uplink transmission is received from the BS, then the method further includes sending a second uplink transmission to the BS without using a request/grant mechanism to obtain an allocation of resources from the BS. The second uplink transmission is sent using a different CTU than the first uplink transmission, and the second uplink transmission carries the same information as the first uplink transmission. In the same example, or in another example, if no ACK signal associated with the first uplink transmission is received from the BS, then the method further includes determining that a number of failed decodings of the information does not exceed a threshold and sending, to the BS, a second uplink transmission to the BS of the information without using a request/grant mechanism to obtain an allocation of resources from the BS. The second uplink transmission is sent using a different CTU than the first uplink transmission, and the second uplink transmission carries the same information as the first uplink transmission. In any one of the preceding examples, or in another example, the first CTU is in a first CTU access region and the second CTU is in the first CTU access region or a second CTU access region. In any one of the preceding examples, or in another example, the method further includes receiving higher layer signaling from the BS that indicates the first CTU. In any one of the preceding examples, or in another example, the method further includes receiving a message from the BS to configure grant-free transmissions by the UE, the message being received via higher layer signaling. An apparatus for performing this method is also provided.

In accordance with yet another embodiment, another method for communicating data is provided. In this embodiment, the method includes receiving a first uplink transmission from a user equipment (UE) without using a request/grant mechanism to allocate resources for the first uplink transmission to the UE and sending an acknowledgement (ACK) signal to the UE when information carried by the first uplink transmission is successfully decoded by the BS. The first uplink transmission is sent using a first contention transmission unit (CTU), and the first CTU includes a time resource, a frequency resource, and a pilot resource. The ACK signal indicates that the information carried by the first uplink transmission was successfully decoded. In one example, the method further includes determining that the information carried by the second uplink transmission cannot be successfully decoded by the BS, and based thereon receiving a second uplink transmission from the UE without using a request/grant mechanism to allocate resources for the second uplink transmission to the UE, wherein the second uplink transmission is sent using a different CTU, and wherein the second uplink transmission carries the same information as the first uplink transmission. In such an example, the method may further include sending higher layer signaling to the UE that indicates a different CTU. In any one of the preceding examples, or in another example, the first CTU is in a first CTU access region and the different CTU is in the first CTU access region or a different CTU access region. In any one of the preceding examples, or in another example, the method further includes sending higher layer signaling to the UE that indicates the first CTU. An apparatus for performing this method is also provided.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    transmitting, by an apparatus to a base station (BS), Radio Resource Connection (RRC) signaling indicating that the apparatus is capable of grant-free transmissions;
    receiving, by the apparatus from the BS, configuration information that enables a grant-free transmission via a unicast high level signaling without using a request/grant mechanism, wherein the configuration information comprises pilot information; and
    transmitting, by the apparatus to the BS, an uplink data transmission using a pilot, the pilot transmitted over a pilot resource configured by the pilot information received in the unicast high level signaling, wherein the grant-free transmission is a transmission without using the request/grant mechanism to obtain an allocation of transmission resources from the BS, and wherein the transmission resources include the pilot, a time resource, and a frequency resource.

2. The method of claim 1, wherein the configuration information indicates a configuration mapping or re-mapping the apparatus to the transmission resources.

3. The method of claim 1, wherein the transmission resources further include a signature resource.

4. The method of claim 1, wherein the configuration information comprises an apparatus mapping rule mapping the transmission resources to the apparatus, and wherein the method further includes determining the transmission resources based on the apparatus mapping rule.

5. The method of claim 1, wherein the transmission resources are in a time frequency region, and the time frequency region is configured to support grant-free transmissions by a plurality of apparatuses.

6. An apparatus comprising:
    at least one processor; and
    a non-transitory computer readable storage medium storing programming for execution by the at least one processor, the programming including instructions to:
        transmit, to a base station (BS), Radio Resource Connection (RRC) signaling indicating that the apparatus is capable of grant-free transmissions;
        receive, from the BS, configuration information that enables a grant-free transmission via a unicast high level signaling without using a request/grant mechanism, wherein the configuration information comprises pilot information; and
        transmit, to the BS, an uplink data transmission using a pilot, the pilot transmitted over a pilot resource configured by the pilot information received in the unicast high level signaling, wherein the grant-free transmission is a transmission without using the request/grant mechanism to obtain an allocation of transmission resources from the BS, and wherein the transmission resources include the pilot, a time resource, and a frequency resource.

7. The apparatus of claim 6, wherein the configuration information indicates a configuration mapping or re-mapping the apparatus to the transmission resources.

8. The apparatus of claim 6, wherein the transmission resources further include a signature resource.

9. The apparatus of claim 6, wherein the configuration information comprises an apparatus mapping rule mapping the transmission resources to the apparatus, and wherein the programming including instructions to determine the transmission resources based on the apparatus mapping rule.

10. The apparatus of claim 6, wherein the transmission resources are in a time frequency region, and the time frequency region is configured to support grant-free transmissions by a plurality of apparatuses.

11. A method, the method comprising:
    receiving, by a base station (BS) from a user equipment (UE), Radio Resource Connection (RRC) signaling indicating that the UE is capable of grant-free transmissions;
    transmitting, by the BS to the UE, configuration information that enables a grant-free transmission via a unicast high level signaling without using a request/grant mechanism, wherein the configuration information comprises pilot information; and
    receiving, by the BS from the UE, an uplink data transmission using a pilot, the pilot transmitted over a pilot resource configured by the pilot information received in the unicast high level signaling, wherein the grant-free transmission is a transmission without using the request/grant mechanism to obtain an allocation of transmission resources from the BS, and wherein the transmission resources include the pilot, a time resource, and a frequency resource.

12. The method of claim 11, wherein the configuration information indicates a configuration mapping or re-mapping the UE to the transmission resources.

13. The method of claim 11, wherein the transmission resources further include a signature resource.

14. The method of claim 11, wherein the configuration information comprises a UE mapping rule mapping the transmission resources to the UE, and wherein the method further includes determining the transmission resources based on the UE mapping rule.

15. The method of claim 11, wherein the transmission resources are in a time frequency region, and the time frequency region is configured to support grant-free transmissions by a plurality of UEs.

16. A base station (BS) comprising:
 at least one processor; and
 a non-transitory computer readable storage medium storing programing for execution by the at least one processor, the programming including instructions to:
  receive, from a user equipment (UE), Radio Resource Connection (RRC) signaling indicating that the UE is capable of grant-free transmissions;
  transmit, to the UE, configuration information that enables a grant-free transmission via a unicast high level signaling without using a request/grant mechanism, wherein the configuration information comprises pilot information; and
  receive, from the UE, an uplink data transmission using a pilot, the pilot transmitted over a pilot resource configured by the pilot information received in the unicast high level signaling, wherein the grant-free transmission is a transmission without using the request/grant mechanism to obtain an allocation of transmission resources from the BS, and wherein the transmission resources include the pilot, a time resource, and a frequency resource.

17. The BS of claim 16, wherein the configuration information indicates a configuration mapping or re-mapping the UE to the transmission resources.

18. The BS of claim 16, wherein the transmission resources further include a signature resource.

19. The BS of claim 16, wherein the configuration information comprises a UE mapping rule mapping the transmission resources to the UE, and wherein the programming including instructions to determine the transmission resources based on the UE mapping rule.

20. The BS of claim 16, wherein the transmission resources are in a time frequency region, and the time frequency region is configured to support grant-free transmissions by a plurality of UEs.

* * * * *